United States Patent [19]

Shintani

[11] Patent Number: 5,653,895

[45] Date of Patent: Aug. 5, 1997

[54] PLASMA CUTTING METHOD SUITABLE FOR CUTTING THIN STAINLESS STEEL SHEET MATERIAL

[75] Inventor: Toshiya Shintani, Kanagawa-ken, Japan

[73] Assignee: Komatsu Ltd., Japan

[21] Appl. No.: 615,318

[22] PCT Filed: Oct. 14, 1994

[86] PCT No.: PCT/JP94/01731

§ 371 Date: Mar. 18, 1996

§ 102(e) Date: Mar. 18, 1996

[87] PCT Pub. No.: WO95/10385

PCT Pub. Date: Apr. 20, 1995

[30] Foreign Application Priority Data

Oct. 14, 1993 [JP] Japan .................. 5-256874

[51] Int. Cl.[6] ................................. B23K 10/00
[52] U.S. Cl. ................. 219/121.5; 219/121.55; 219/121.39; 219/121.44
[58] Field of Search .............. 219/121.39, 121.44, 219/121.59, 121.51, 121.55, 75, 121.48, 121.5

[56] References Cited

U.S. PATENT DOCUMENTS 4,125,754  11/1978  Wasserman et al. ............. 219/121.48
5,396,043  3/1995   Couch, Jr. et al. ............... 219/121.5

FOREIGN PATENT DOCUMENTS 59-229282  12/1984  Japan .
1-172473   12/1989  Japan .
5-84579    6/1993   Japan .

Primary Examiner—Mark H. Paschall
Attorney, Agent, or Firm—Ronald P. Kananen

[57] ABSTRACT

There is provided a plasma cutting method using a plasma cutting apparatus which comprises a plasma torch including: an electrode; a confining nozzle so arranged as to surround the electrode with a spacing therefrom that defines a passage for flushing a plasma gas; and an assisting nozzle so arranged as to surround the confining nozzle with a spacing therefrom that defines a passage for flushing a secondary gas, characterized in that a rate of flow of the secondary gas per unit area Vq which is expressed by an equation: $Vq=Q/A_2$ is not less than 250 ($m^3/sec/m^2$), where Q is a rate of flow of the secondary gas and $A_2$ is a pinched area of the secondary gas.

6 Claims, 10 Drawing Sheets

PLASMA CUTTING METHOD SUITABLE FOR CUTTING THIN STAINLESS STEEL SHEET MATERIAL

TECHNICAL FIELD

The present invention relates to a plasma cutting method for cutting a workpiece such as of a steel material. More particularly, it relates to a plasma cutting method which is suitable for the cutting of a stainless steel sheet metal that is especially of a thickness not greater than 6 mm.

BACKGROUND ART

Figure 1:
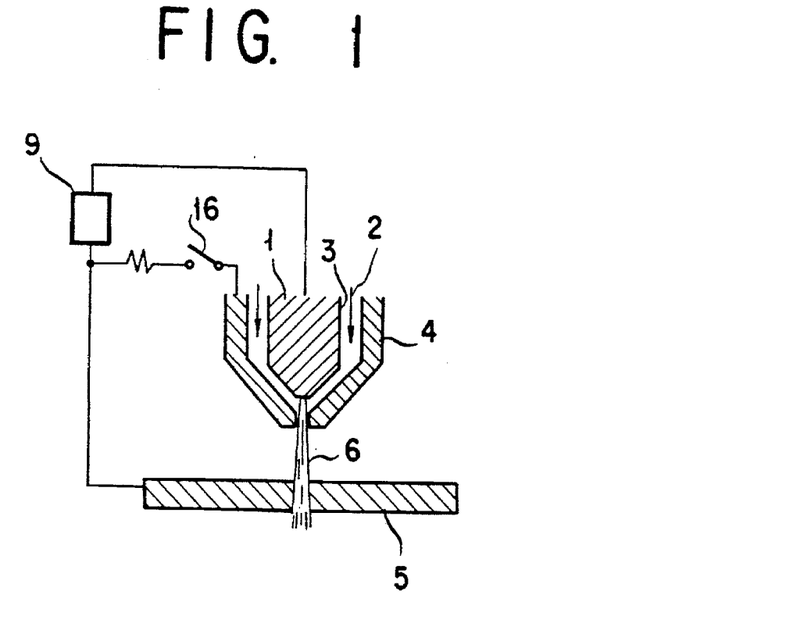
FIG. 1 is a diagrammatic view illustrating a plasma cutting apparatus that has hitherto be used to carry out a conventional plasma cutting method.

Customarily, an apparatus that is used for plasma cutting is constructed as shown in FIG. 1. More specifically, a plasma torch in such an apparatus is provided with a centrally positioned electrode 1 and a confining nozzle 4 that is arranged to surround the electrode with a spacing therefrom which defines a passage 3 for a plasma gas 2. And, there is provided a plasma power supply 9 which is connected across to the electrode 1 and a workpiece 5, and further to the confining nozzle 4 via a switch 16. A cutting operation using such an apparatus is carried out by passing a plasma gas 2 through the passage 3 while generating a plasma arc between the electrode 1 and the workpiece 5 to produce a high temperature plasma gas stream 6 that is narrowly pinched by means of the confining nozzle 4 so as to project onto a given portion of the workpiece material 5. That portion of the workpiece 5 is thereby molten and removed.

By the way, it is typical in the plasma cutting that a quality of cutting may be enhanced by selecting a suitable plasma gas 2 with respect to a workpiece material 5. For example, by using an oxygen gas in cutting a mild steel, it has been known that an operation can be performed to yield a smooth surface of cutting with a dross less attached thereto and yet at an elevated cutting rate.

Also, in cutting a stainless steel material, it has been known that an inert or a reducing gas such as a nitrogen, argon+hydrogen or nitrogen+argon+hydrogen gas can be used to give rise to a smooth cutting surface and, when the workpiece thickness is not less than 6 mm, with a dross less attached thereto and with a high quality of cutting.

However, in case the workpiece is a thin stainless sheet material that is of a thickness less than 6 mm, it has been recognized that such a high quality of cutting is no longer obtainable.

More specifically, if it is attempted to cut a stainless sheet material that is so thin with an inert or a reducing gas as the plasma gas, a large quantity of the dross will be attached to the cut workpiece surface and cannot at the least be peeled. As a result, a subsequent operation such as to grinding off the dross securely deposited onto the cut workpiece surface with a grinder has hitherto been required. Further, since a large quantity of the dross is adhered to the cut workpiece material, it has been found that a heat is conducted from the adhered dross into the workpiece material, thus giving rise to a large thermal deformation thereof. For those reasons, the use of an inert or a reducing gas as the plasma gas for cutting a stainless steel workpiece material has been found to be virtually impractical.

Also, although it is known that if a stainless sheet material is cut using an oxygen gas as the plasma gas, a considerable improvement can be achieved with respect to the problems of a dross that is tending to deposit onto a rear side of the workpiece material, it is also known that the cut surface of the workpiece is severely oxidized by the oxygen gas and consequently becomes blackened and rough. Also, if the cutting rate is set fast, a large amount of the dross will be blown up above the upper surface of a cutting portion of the workpiece material and will build up thereon, thereby reducing the quality of a resultant cut. Conversely, if the cutting rate is set slow, the input heat into the workpiece material will be enlarged, thus enlarging the thermal deformation thereof. Then, in addition, with the oxidation of the cutting surface being promoted, the quality of a resultant cut will still further be lowered. Thus, it has commonly be recognized that it is difficult to properly set the cutting rate.

As set forth above, if a stainless steel sheet material of a thickness not greater than 6 mm is to be cut by plasma cutting, it may be clearly apparent that an effort to variously alter the plasma gas has not result in a good quality of the plasma cut.

Figure 2:
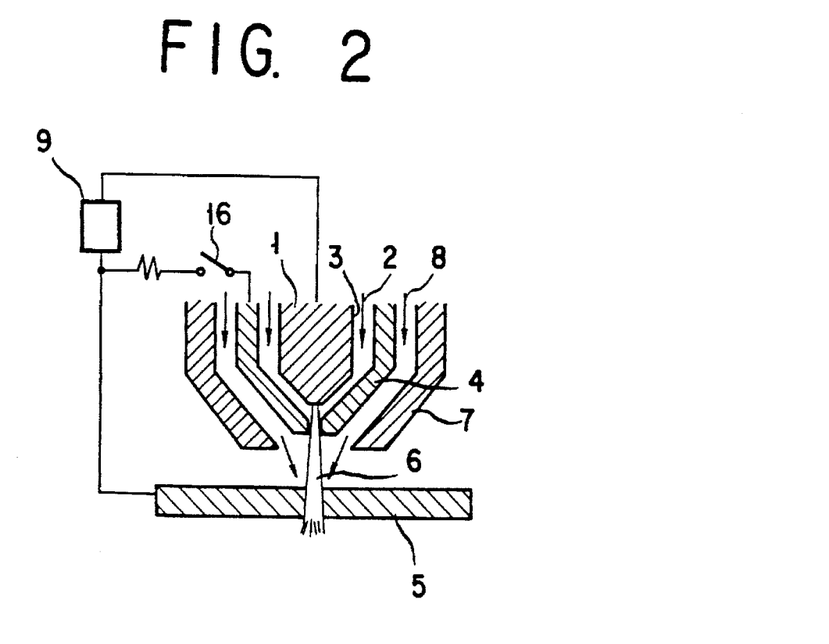
FIG. 2 is a diagrammatic view illustrating another plasma cutting apparatus that has hitherto been used to carry out another conventional plasma cutting method.

Also, it should be noted that another type of the plasma cutting apparatus has been proposed, as shown in FIG. 2, in which the plasma torch is provided with an assisting nozzle 7 that is mounted around the confining nozzle 4 with a spacing therefrom defining a blow-out passage which is concentrically arranged with the confining nozzle 4. With the assisting nozzle 7 so arranged, the circumference of the plasma gas flow is shielded with a secondary gas 8 which is designed to enable the gaseous atmosphere around a cutting area to be controlled.

An example of the preceding type of the plasma cutting apparatus has been proposed as has been disclosed, for example, in Japanese Unexamined Patent Publication No. Sho 59-229,282, if the plasma gas 2 is composed of an oxygen gas, the secondary gas 8 is composed of an oxygen gas as well to shield the cutting area from the atmosphere. Such an example has been contemplated to cut a mild steel workpiece with a high quality of cutting by holding the oxygen purity in the cutting environment to be high.

There has also been proposed a modified system in which both the plasma gas 2 and the secondary gas 8 are composed of an inert gas so that the cutting area may be prevented from being oxidized by the atmosphere.

There has further been proposed another modified system in which the plasma gas 2 is composed of an inert gas and the secondary gas is constituted by a gas that is rich in the oxygen concentration. By feeding the oxygen gas into the cutting area, this modification has been intended to improve the quality of cut of a mild steel workpiece with the oxygen gas while elongating the utility life of the electrode with the inert gas.

On the other hand, the purpose of using the secondary gas has also be made, as is apparent from Japanese Unexamined Patent Publication No. Hei 05-84,579, to aim in protecting the confining nozzle from the dross that may be blown up from the workpiece material at the times of piercing and cutting thereof. In this case, the purpose of using the secondary gas is not to alter the gaseous atmosphere in the cutting area, but to deal with a dross scattering from the workpiece material by thrusting back the dross to prevent it from being adhered onto the confining nozzle.

By the way, the usage of the secondary gas in these plasma cutting methods has hitherto been set to an amount that is as little as possible. This has come from the economical requirement that the amount of its consumption should be minimized as well as from the emphasized requirement that the secondary gas which is confined and blown out should not interfere with the plasma gas and then should not either disturb or cool the plasma gas. Also, a care has been taken to ensure that the secondary gas flow should be oriented externally as much as possible so as not to interfere with the plasma gas flow.

At this point, it should be noted that the reasons why the secondary gas flow and the plasma gas flow have been controlled not to interfere with each other are that the conventional plasma cutting technique is designed to cut a workpiece by melting and removing a predetermined portion thereof with a high temperature and high speed plasma flow, and that the plasma gas flow flushed from the confining nozzle, if disturbed and cooled there, would lower the cutting capacity.

In this manner, the conventional plasma cutting method using a secondary gas is characterized by only a small usage thereof and has thus utilized, basically just as in a form in which no secondary gas is used, a high temperature and high speed flow of the plasma. For this reason, it should be apparent that it has not been expected in the plasma cutting technique to largely improve the quality of cutting a stainless sheet workpiece material of a thickness that is not greater than 6 mm.

On the other hand, if the rate of flow of the secondary gas is increased, a pilot arc as required in starting a plasma cutting operation will be disturbed by the secondary gas; hence the ignitionability in plasma cutting will be deteriorated. Also, due to the pinch effect for the plasma flow by means of the secondary gas flow, the arc voltage may be elevated and, especially immediately after piercing, an excessive arc voltage may be created, thus making it highly susceptible for an arc to be extinguished.

In this manner, since an increase in the rate of the secondary gas flow largely influences the ignitionability at the starting time of a plasma cutting operation, a mere increase in such a rate of flow alone has hitherto made it difficult to operate a plasma arc cutting apparatus satisfactorily.

Accordingly, it is an object of the present invention to provide a plasma cutting method which is capable of improving the quality of a resultant cut when cutting a stainless steel sheet material of a thickness that is not greater than 6 mm while improving the ignitionability at the starting time of a plasma cutting operation.

SUMMARY OF THE INVENTION

In order to achieve the above mentioned object, there is provided in accordance with the present invention, a plasma cutting method using a plasma cutting apparatus which comprises a plasma torch including: an electrode; a confining nozzle so arranged as to surround the electrode with a spacing therefrom that defines a passage for flushing a plasma gas; and an assisting nozzle so arranged as to surround the confining nozzle with a spacing therefrom that defines a passage for flushing a secondary gas, characterized in that a rate of flow of the secondary gas per unit area Vq which is expressed by an equation: Vq=Q/A2 is not less than 250 $(m^3/sec)/m^2$, where Q is a rate of flow of the secondary gas and A2 is a pinched area of the secondary gas.

According to the above mentioned construction, with the secondary gas being blown onto a cutting portion and into a vicinity thereof, a dross that may be deposited onto the lower side of a workpiece material and a dross that may be blown up above the upper side of the workpiece material and then deposited thereon can be largely reduced.

In an explanation of the phenomenon that is involved in the present process, it should be noted that, first of all, a dross is deposited onto the lower side of a workpiece material by reason of the fact that, of such a part of the workpiece material which is molten by a high temperature plasma gas flow, a portion that remains as not being blown off is building up onto a rear side of the cutting portion of the workpiece material. The function of the secondary gas onto the dross that is thus deposited onto the lower side of the workpiece material is to give a momentum required to blow off such a dross that is still in a molten state rearwards of the cutting portion. Accordingly, the blowing force of the secondary gas will have to be stronger than a certain value, and it has been found that what corresponds to this value is the above mentioned Vq (=250 $(m^3/sec)/m^2$).

Also, the fact that a dross is blown up above the upper side of the workpiece material is considered due to the fact that forwardly of the cutting portion a portion of the plasma gas flow is incapable of penetrating the workpiece material and is held back to the upper side. Then, with the secondary gas being blown onto a front side of the cutting portion of the workpiece material, that portion of the plasma gas which is forced back to the upper side will be held in and can thus be reduced. In this case as well, it has been found that by intensifying the blowing force of the secondary gas, the dross which is blown up can effectively be held in and that the deposition of the dross is reduced from a point where Vq exceeds 250 $(m^3/sec)/m^2$.

Further, if the assisting nozzle is arranged concentrically with the confining nozzle, the above mentioned function can be obtained independently of any cutting direction and this has been found to be practical.

In the above mentioned construction, it is preferred if the confining nozzle is provided with a front end having an outer diameter D1 which is not less than 1.5 mm and not greater than 4.0 mm; the front end of the confining nozzle has an outside pinching angle α which is equal to or greater than 0° and less than 90°; the assisting nozzle is provided with a pinching portion having an inner diameter D2 which is not less than 2.0 mm; and the assisting nozzle is provided with a front end having an inside pinching angle β which is equal to or greater than 0° and less than 90°.

According to this construction, with both the front end outside of the confining nozzle and the front end inside of the assisting nozzle being tapered in configuration, it is possible to concentrate the secondary gas onto a cutting portion and into a vicinity thereof.

Also, the outer diameter D1 of the front end of the confining nozzle should not be too large in order to allow the secondary gas to be concentrated onto a cutting portion of the workpiece material. The reason for this is as follows: The secondary gas which has passed outside the confining nozzle is suddenly expanded when being flushed downwards of the front end surface of the confining nozzle. The larger the outer diameter of the front end of the confining nozzle, the larger will be the rate of its expansion. As a result, there will be developed a large region of abrasion in the vicinity of the front end of the confining nozzle, which makes it difficult to impart an effective flushing force to the cutting surfaces of the workpiece material because of a disturbance and diffusion of the secondary gas flow. In addition, the larger the outer diameter of the front end of the confining nozzle, the larger will be the spacing between the secondary gas and the high temperature plasma gas that is flushed out of the confining nozzle for cutting. Disturbed by the region of abrasion in the vicinity of the front end of the confining nozzle, the flushing gas needs to take a long way to reach the cutting portion of the workpiece material. As a result, it follows that the weakened secondary gas will make it difficult to impart an effective flushing force to the cutting surfaces of the workpiece material. The influence of the weakening of the flushing force of the secondary gas will be particularly noticeable for the dross that is being blown up from the upper side of the cutting surfaces of the workpiece material and, if the outer diameter D1 of the front end of the confining nozzle becomes excessively large, the quality of the upper surface of the cutting workpiece material will be deteriorated due to a deposition of the dross. Accordingly, it needs to be avoided for the outer diameter D1 of the front end of the confining nozzle to become in excess of 4 mm. On the other hand, the smaller the outer diameter of the front end of the confining nozzle, the worse will be the cooling of the front end of the confining nozzle and the higher will be the danger that the front end of the confining nozzle becomes molten. Hence, it cannot be reduced in size to less than 1.5 mm.

Next, with respect to the inner diameter D2 of the pinching portion of the assisting nozzle, a certain amount of the momentum of the secondary gas is required for blowing off the dross adhered onto the lower side of the workpiece material, or for restraining it from being blown up towards its upper side. Thus, the secondary gas must be secured to hold a certain minimum rate of flow, which must not be too low. More specifically, even with a rate of flow per unit area Vq being identical, the larger the area A2 of the pinched portion, the greater will be the rate of flow of the secondary gas. Since the momentum possessed by the secondary gas is thus larger, it follows that the area A2 of the pinched portion of the assisting nozzle must not be too small. According to an experiment, it has been shown that when the rate of flow per unit area Vq is in an order as mentioned above, there is a tendency that the larger the inner diameter D2 of the pinched portion of the assisting nozzle, the less in amount will be the dross that is adhered onto the lower side of the workpiece material. Since with the diameter D2 of the pinched portion of the assisting nozzle reduced to 2 mm, the reducing tendency for the dross height is reduced, it must be avoided to make it less than this value.

In addition to the first and second constructions mentioned above, it is recommended that the secondary gas which is flushed from the assisting nozzle be terminated during each of a pre-flow period and a post-flow period and be flushed only in a period from immediately after a start of cutting until an end thereof.

In view of the fact that it is when a cutting operation is being performed that the secondary gas is required to achieve the operation with a good quality of a resultant cut, if the secondary gas flow is terminated during both the pre-flow and the post-flow stages which make it unnecessary to use the secondary gas, the usage of the secondary gas can advantageously be minimized; this is certainly economical.

Further, in addition to the first and second constructions mentioned above, it is preferred that the front end of the assisting nozzle be designed to project beyond the front end of the confining nozzle, that the said assisting nozzle be electrically insulated from the confining nozzle; that the rate of flow of the secondary nozzle that is flushed from the assisting nozzle be held at a low value as compared with the rate of flow of that which is flushed at a start of cutting; and that the rate of flow Vq be increased to not less than 250 $(m^3/sec)/m^2$ only in a period from immediately after the start of cutting until and end thereof.

According to this construction, it will be noted that the secondary gas is flushed also during a pre-flow period with the aim of protecting the confining nozzle so that it may not be damaged by a molten dross which is blown up from a workpiece material at the time of piercing when a cutting operation is initiated for a period until a penetrating hole is formed through the workpiece material. If the rate of flow of the secondary gas during the pre-flow period is then at a value same as that in the cutting operation, a high rate of flow of the secondary gas will cause a pilot arc to be disturbed and cooled thereby so that the pilot arc may not be held in a high temperature state and thus may not reach the workpiece material. As it then become difficult for the pilot arc to shift into a plasma arc state, it follows that there will develop a problem in regard to the ignitionability when the cutting operation is started. In order for this problem not to be brought about, it will now be apparent that in the above mentioned construction, it is designed not to disturb the pilot arc by the secondary gas but to improve the ignition-ability of a pilot arc by flushing a large amount of the secondary gas only during the cutting operation, in addition to the control of its rate of flow to such a degree that it may just hold down a molten dross that can be blown up during the pre-flow period. In this connection, it should be noted that by so doing, the usage of the secondary gas during the pre-flow period as well as during the post-flow period can naturally be minimized.

Further, in addition to the fourth construction mentioned above, the rate of flow of the secondary gas may be switched from a low value to not less than $Vq=250$ $(m^3/sec)/m^2$ with a predetermined delay of time immediately after the cutting operation is initiated.

According to the preceding construction, it is possible to ensure that a plasma arc may not be extinguished immediately after the piercing of a workpiece material, where the latter is being cut as it is mounted on an XY table or the like.

In an explanation of the foregoing, it can first be noted that a cause by which a plasma arc is extinguished may be where the voltage therefor is elevated to exceed a suppliable voltage of the power supply. The voltage for a plasma arc is first elevated immediately after a workpiece material is pierced. This is because immediately after the workpiece material is pierced whereby a penetrating hole is formed therethrough, there is a delay of time before the XY table or the like commences to be displaced and the plasma arc in the meantime is elongated down through the lower side of the workpiece material. An increase in the arc voltage by reason of this delayed operation will disappear when the feed of displacement has reached a predetermined rate of displacement. Also, if the flushing of a large amount of the secondary gas will, under its influence, cause the plasma arc to be pinched, thus increasing the arc voltage. Since if the operational delay of the XY table and the flushing of a large amount of the secondary gas are overlapped, the extent of the increase in the arc voltage is enlarged, it will be necessary to set the power supply so that its suppliable output voltage may be considerably high.

Accordingly, in the construction mentioned above, it should be noted that the power supply is so set that its suppliable output voltage may not need to be excessively elevated, by adopting a scheme in which the time at which a large amount of the secondary gas commences to be flushed is to be delayed after the time at which the workpiece material commences to be pierced and in which an increase in the arc voltage by reason of the operational delay of the XY table immediately after the start of piercing and an increase in the arc voltage by reason of the voluminous flushing of the secondary gas are not to be overlapped.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and understanding thereof.

In the accompanying drawings.

BEST MODES FOR CARRYING OUT THE INVENTION

Hereinafter, suitable embodiments of the plasma cutting method according to the present invention will be set out with reference to the accompanying drawings.

Figure 3:
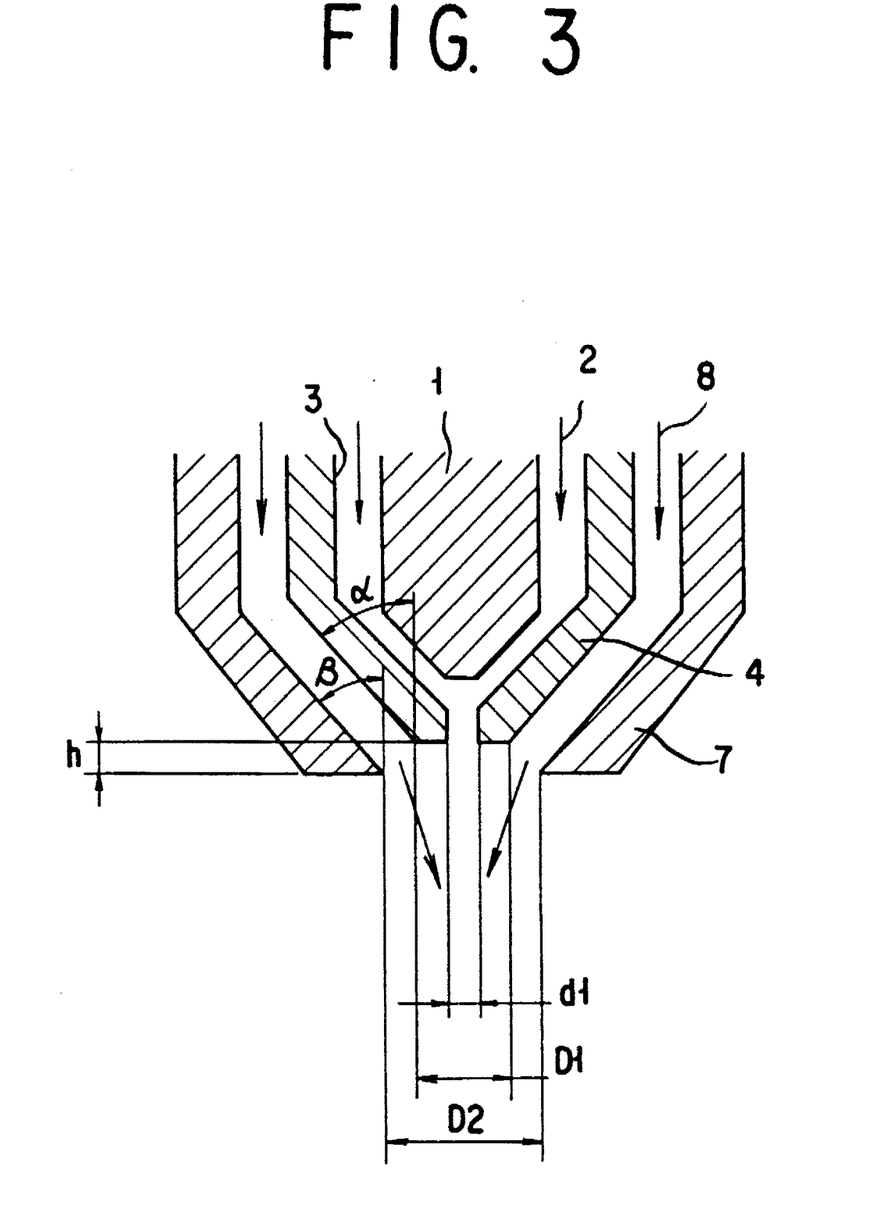
FIG. 3 is a cross sectional view diagrammatically illustrating a plasma torch in a plasma cutting apparatus that can be used to carry out a first embodiment of the plasma cutting method according to the present invention.
Figure 4:
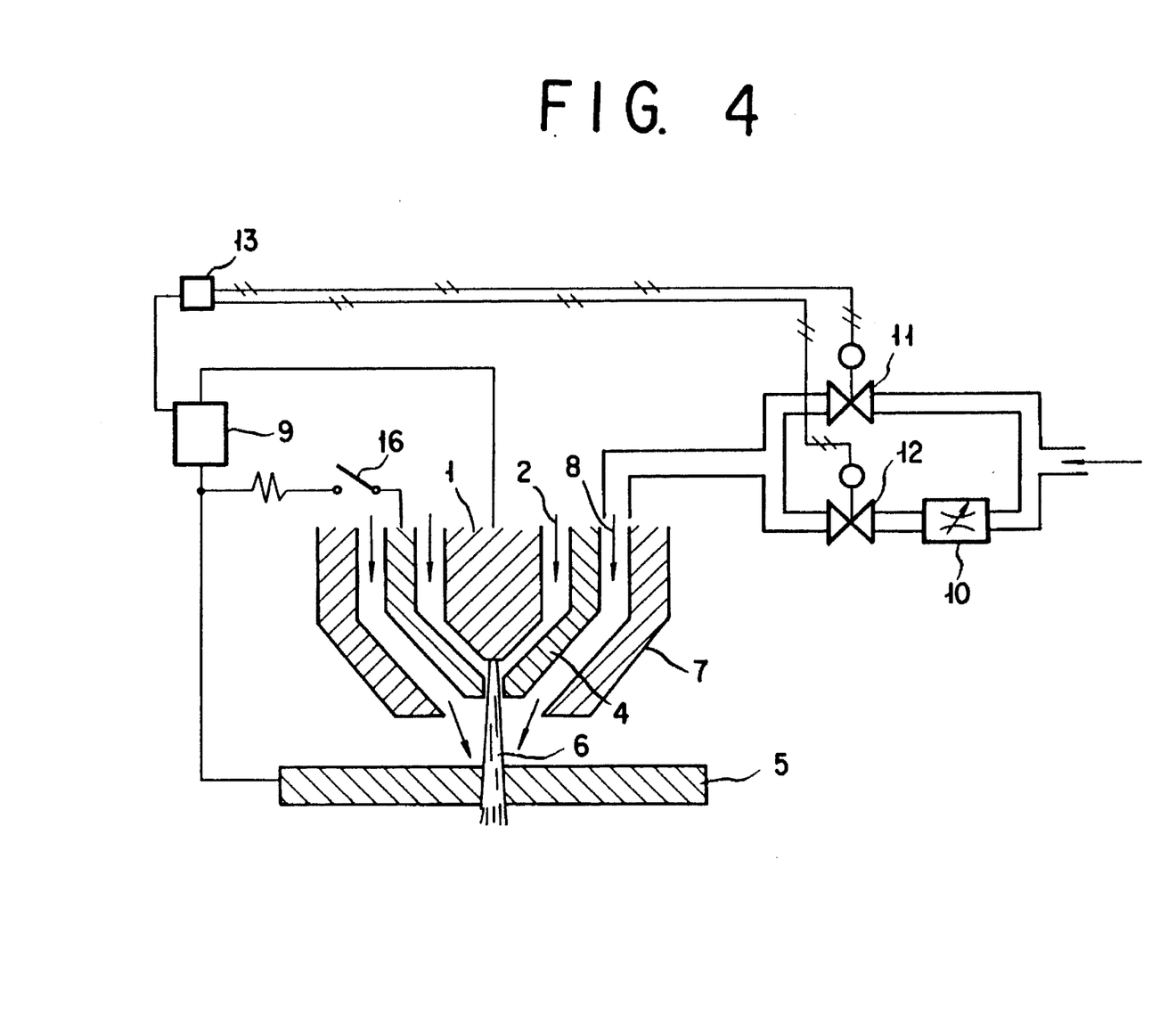
FIG. 4 is a diagrammatic view illustrating a gas supply circuit in the plasma cutting apparatus shown in FIG. 3.

FIG. 3 shows a front end portion of the plasma torch in the plasma cutting apparatus for carrying out the first embodiment of the plasma cutting method according to the present invention, whereas FIG. 4 shows the gas supply circuit in the plasma cutting apparatus. The plasma torch shown in FIG. 3 is basically identical in structure to a conventional plasma cutting apparatus. In FIG. 3, $\alpha$ designates a pinching angle outside of the front end of the confining nozzle 4; $\beta$ denotes a pinching angle inside of the front end of the assisting nozzle 7; h represents a distance between the front end of the confining nozzle 4 and the front end of the assisting nozzle 7; d1 designates an inner diameter of the front end of the confining nozzle 4; D1 denotes an outer diameter of the front end of the confining nozzle 4; and D2 represents an inner diameter of the front end of the assisting nozzle 7. In this construction, D1 which is the outer diameter of the front end of the confining nozzle 4 is dimensioned as being not less than 1.5 mm and not greater than 4.0 mm; $\alpha$ which is the pinching angle outside of the front end of the confining nozzle 4 is dimensioned as being equal to or more than 0° and less than 90°; D2 which is the inner diameter of the front end of the assisting nozzle 7 is dimensioned as being not less than 2.0 mm; and $\beta$ which is the pinching angle inside of the front end of the assisting nozzle 7 is dimensioned as being equal to or more than 0° and less than 90°.

Figure 5:
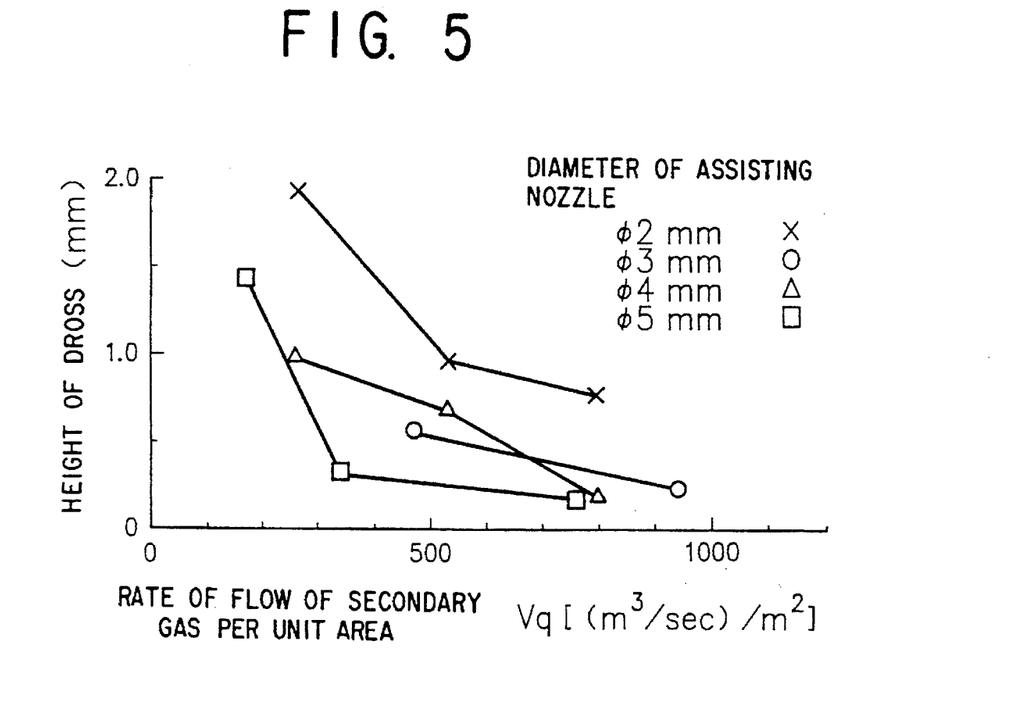
FIG. 5 is a graph diagrammatically illustrating certain results of a measurement which has been conducted in regard to the practical effects which are achieved with the above mentioned first embodiment of the present invention.
Figure 6:
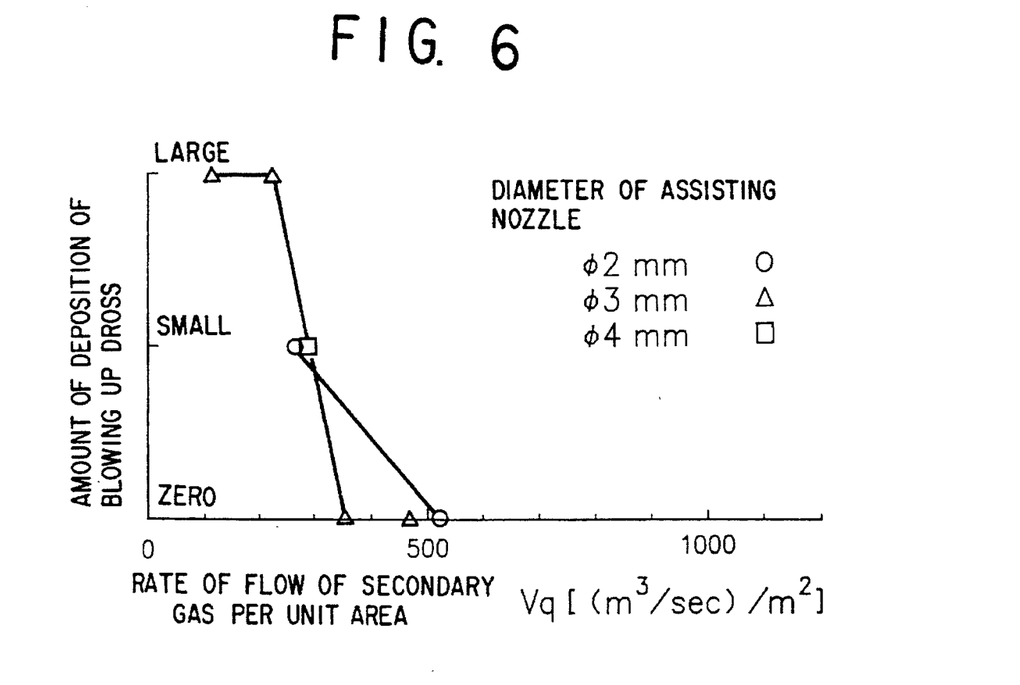
FIG. 6 is a graph diagrammatically illustrating certain other results of a measurement which has been conducted in regard to the practical effects which are achieved with the above mentioned first embodiment of the present invention.

FIGS. 5 and 6 show the results of a series of measurements, which demonstrate the practical effects of the above mentioned first embodiment. According to the graphs shown, a fact is demonstrated that if the rate of flow of the secondary gas per unit area Vq which is denoted by $Vq=Q/A2$, where Q is the rate of flow of the secondary gas 8 and A2 is the pinched area of the assisting nozzle 7, is set to be not less than 250 $(m^3/sec)/m^2$ and not greater than 1000 $(m^3/sec)/m^2$, it is possible to reduce the amount of the drosses which may be deposited onto the upper and lower sides of a workpiece material.

More specifically, the graph of FIG. 5 shows the relationship of the blowing force of the secondary gas 8 with the amount of the dross that is adhered onto the lower side of a workpiece material 5 as the results of a measurement when a plasma cutting method was carried out in which the workpiece material 5 was composed of a stainless steel (SUS304) of a plate thickness of 2 mm, the plasma current was set at 40 A, the secondary gas 8 was composed of air and the cutting rate achieved was 2.0 m/min. In the graph of FIG. 5, the ordinate is shown to represent the height of dross as its amount adhered while the abscissa is shown to represent a value of the rate of flow Q of the secondary gas 8 divided by the pinched area A2, the value indicating the blowing force of the secondary gas 8 and being here referred to as the rate of flow of the secondary gas 8 per unit area that is designated as Vq. And, there stands an equation: $A2=\pi/4 \times (D2)^2$ where D2 is the inner diameter of the pinching portion of the assisting nozzle 7.

According to the graph of FIG. 5, it is seen that the amount of the adhered dross tends to be reduced from where Vq exceeds 250 $(m^3/sec)/m^2$. Also, the reason why in this graph there is no data shown in an area where Vq exceeds 1000 $(m^3/sec)/m^2$ is that in that area the cutting itself became impossible. This is thought to be due to the fact that as the rate of flow of the secondary gas 8 is increased, the pressure within the assisting nozzle is elevated, and thus the secondary gas 8 of an elevated pressure acts to prevent the plasma gas 2 from being flushed from the confining nozzle 4.

The graph of FIG. 6 shows the relationship of the blowing force of the secondary gas 8 with the amount of the dross which is blown up to the upper side of the workpiece material 5 and then deposited thereon as the results of a measurement when a plasma cutting method was carried out under the conditions which are similar to those adopted to yield the graph of FIG. 5. The amount of deposition of the dross blown up, that is represented along the ordinate, was determined visually.

According to the graph of FIG. 6, it is seen that by strengthening the blowing force of the secondary gas 2, it is possible to effectively hold down the blowing-up of the dross and that the amount of the dross deposited tends to be reduced from where Vq exceeds 250 $(m^3/sec)/m^2$.

From the foregoing, it is seen that in order to effectively reduce the amount of the drosses which are deposited and adhered onto the upper and lower sides of a workpiece material 5, that is here composed of a stainless steel sheet material, the value Vq should desirably range between 250 $(m^3/sec)/m^2$ and 1000 $(m^3/sec)/m^2$.

Figure 7A:
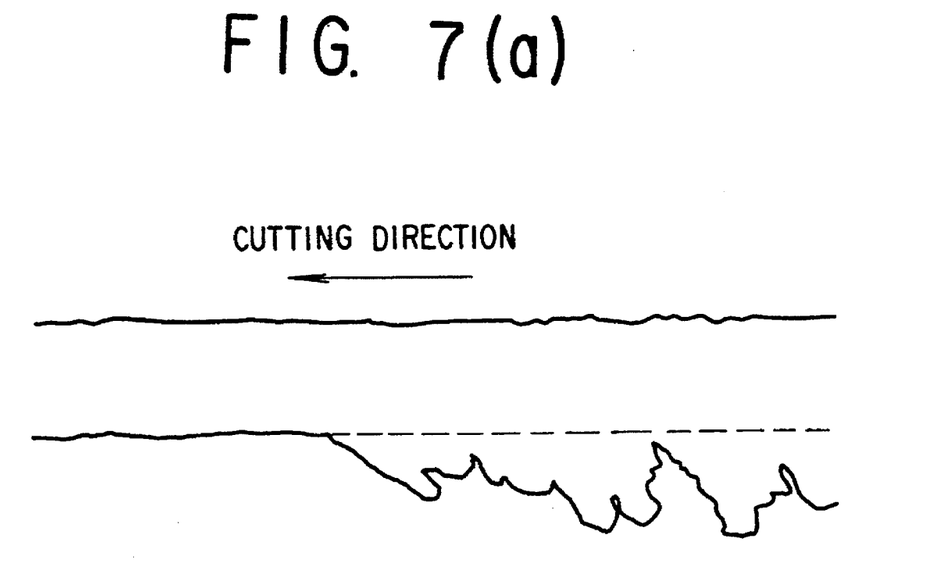
FIG. 7(a) is a cross sectional view diagrammatically illustrating a pair of cut surfaces which have resulted from the use of a plasma cutting method in the prior art.
Figure 7B:
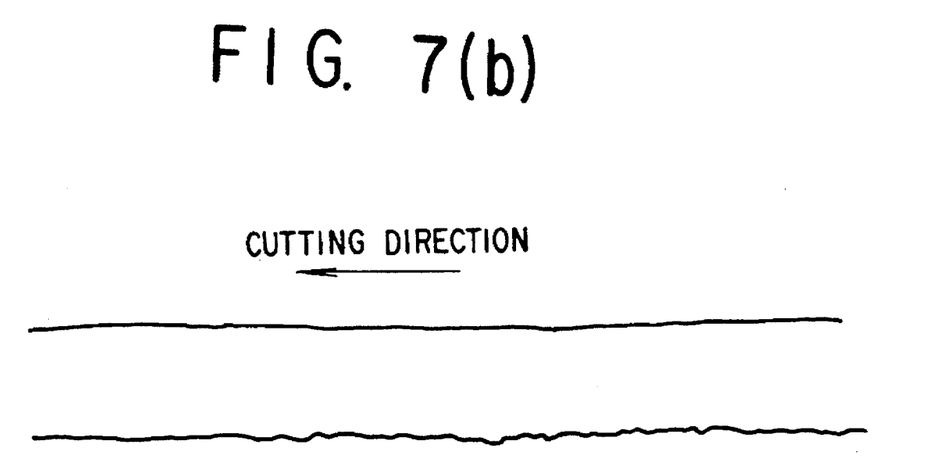
FIG. 7(b) is a cross sectional view diagrammatically illustrating a pair of cut surfaces which have resulted from a use of the above mentioned first embodiment of the plasma cutting method according to the present invention.

FIGS. 7(a) and 7(b) show, respectively, an enlarged cross sectional view of cut surfaces of a stainless steel (SUS304) of a plate thickness of 2 mm which are cut by a conventional plasma cutting method and an enlarged cross sectional view of cut surfaces of the same which are cut by the above mentioned first embodiment of the present invention. The cutting conditions which were adopted to have yielded the diagram of FIG. 7(b) are that for the configurations of the nozzles of a plasma torch as shown in FIG. 3, the values which are listed in the Table 1 below were taken, and that the plasma gas 2 is composed of nitrogen, the cutting current was set at 40 A and the secondary gas 8 was composed of air and had its flow rate of 300 l(N)min. In comparison, the cutting conditions which were adopted to have yielded the diagram of FIG. 7(a) are that the plasma gas was composed of nitrogen and the cutting current was set at 40 A and that the confining nozzle has its configuration which is the same as adopted in the operation that yielded the diagram of FIG. 7(b) and the non-use of the secondary gas alone differed from that operation.

TABLE 1

| The Outer Diameter of the Front End of a Confining Nozzle | D1 | 2 mm |
| --- | --- | --- |
| The Pinching Angle Outside of the Front End of the Confining Nozzle | α | 30° |
| The Inner Diameter of the Front End of an Assisting Nozzle | D2 | 3 mm |
| The Pinching Angle Inside of the Front End of the Assisting Nozzle | β | 30° |

By these diagrams of FIGS. 7(a) and 7(b), it is shown that a remarkable reduction of the amount of the drosses which may be deposited and adhered onto the upper and lower sides of a workpiece material has been attained according to the present invention.

In connection with the foregoing, while in the example of FIG. 7(b) the secondary gas was composed of air and the plasma gas was composed of nitrogen, it should be borne in mind that, when the fact is taken into consideration that the secondary gas is used in a large amount, it is economically advantageous to use as the secondary gas the air which is the most inexpensive and that it is advantageous to use as the plasma gas the nitrogen which is limiting the electrode wear and yet is comparatively inexpensive. Thus, this combination of the plasma and secondary gases is believed to be extremely economically excellent. Of course, even if the plasma gas and the secondary gas were combined otherwise, it would clearly be apparent that a practice of the above mentioned first embodiment enables the dross attachment to be markedly reduced while permitting an extremely enhanced quality of the resultant cut to be obtained.

Also, it will be noted that a reduction in the dross attachment onto the upper side of a workpiece material 5 makes it possible to speed up the cutting rate. Further, in view of the fact that the cut surfaces are rapidly cooled by the secondary gas in a large amount after the cutting is terminated, it will be readily apparent that an effect is achieved that a workpiece material 5 can be cut with an extremely small degree of thermal deformation.

Also, it should be noted that the use of a secondary gas which is less rich in the oxygen concentration, such as air, or alternatively therefor an inert gas such as nitrogen enables the cutting surfaces to be refrained or prevented from being oxidized. The blackening of cutting surfaces of the workpiece material are then avoided, thus resulting in an excellent quality of a resultant cut. Further, the use of a plasma gas and a secondary gas which are both composed of a reducing gas, such as nitrogen plus hydrogen, that contains several percent to several tens percent of hydrogen should make the cutting surfaces substantially completely free from oxidation and thus should give rise to yielding such cut surfaces of a workpiece material as having a beautiful metallic luster and free from oxidation and burning.

Figure 8:
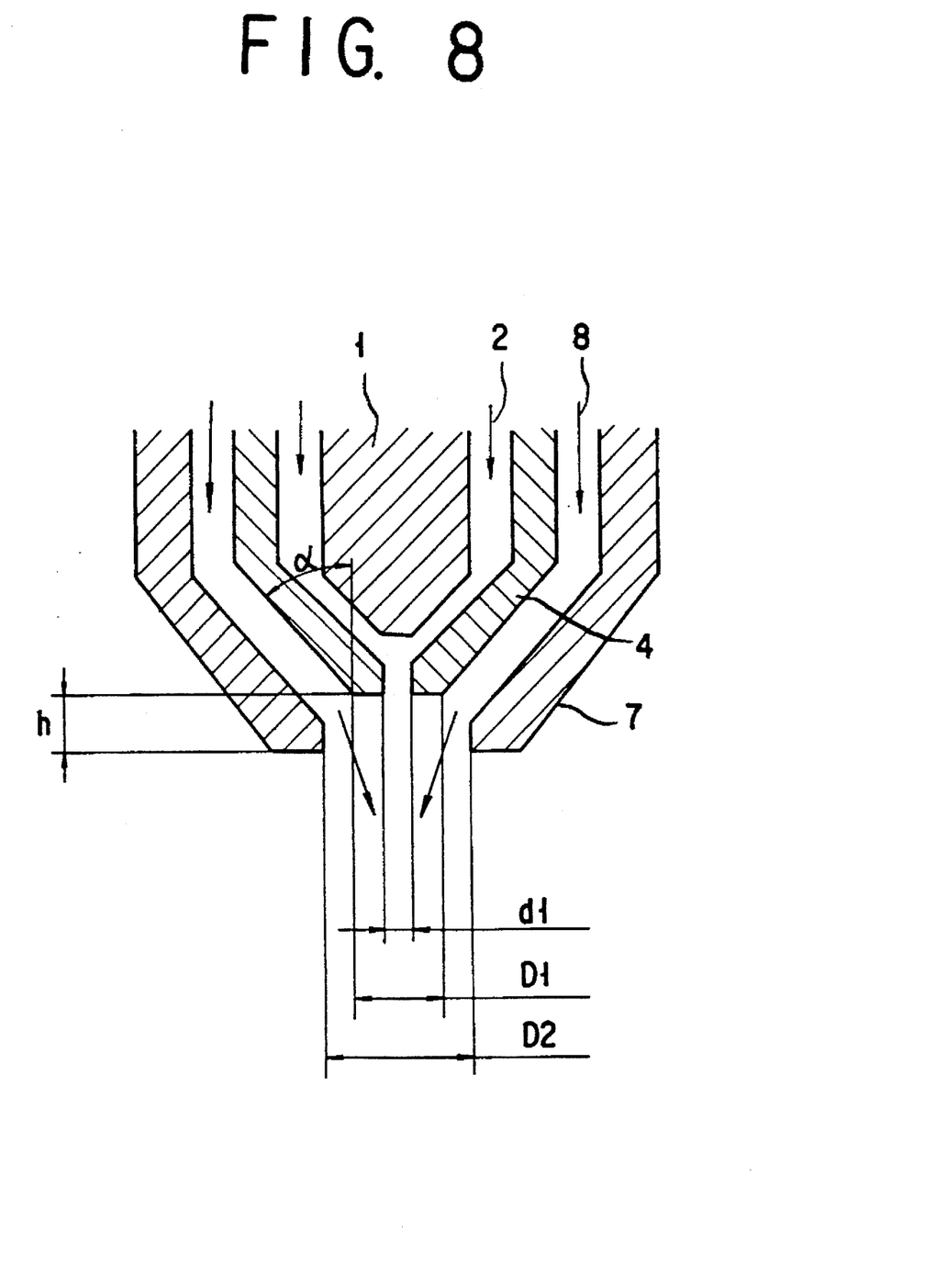
FIG. 8 is a cross sectional view diagrammatically illustrating another embodiment of the plasma torch in the plasma cutting apparatus that is used to carry out the plasma cutting method according to the present invention.

FIG. 8 shows another construction of the front end portion of a plasma torch in a plasma cutting apparatus for carrying out the above mentioned first embodiment according to the present invention. Note that the pinching angle inside of the front end of the assisting nozzle 7 is set at 0°. In this way, it is possible to make the inner surface of the front end portion of the assisting nozzle 7 in parallel to the center axis thereof. Also, it is naturally permissible for an area outside of the front end of the confining nozzle 4 and an area inside of the front end of the assisting nozzle 7 to be chamfered to a small extent.

Figure 9:
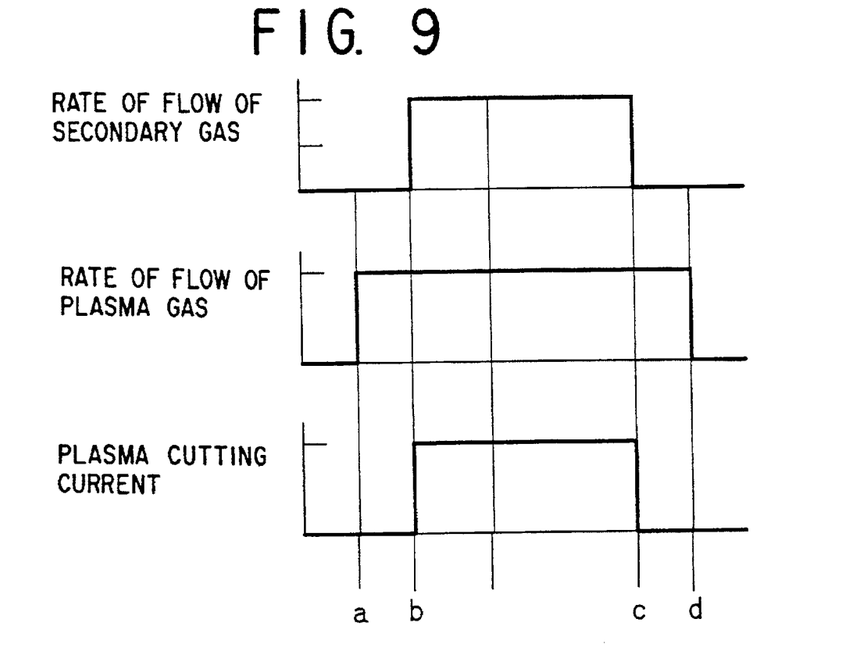
FIG. 9 is a time chart diagrammatically illustrating a mode of operation that is involved in a second embodiment of the plasma cutting method according to the present invention.

FIG. 9 represents a time chart in a mode of operation that is involved in a second embodiment of the plasma cutting method according to the present invention. In this FIG., a symbol a designates a point of time at which the plasma cutting apparatus receives a command for initiating a cutting operation and from which a plasma gas 2 commences to be flushed as a pre-flow by the plasma cutting apparatus. A plasma cutting current for initiating the cutting operation is started to be passed by the plasma cutting apparatus at a point of time b which is a predetermined time after the point of time a. Thus, the point of time b represents the starting point of time for piercing a workpiece material 5. Thereafter, the cutting operation is carried out until a point of time c at which the plasma cutting apparatus in response to a cutting termination command is switched to stop the plasma cutting current and to terminate the cutting operation. A symbol d represents a point of time at which a post-flow of the plasma gas 2 which has persisted for a predetermined time is ended. In the present embodiment, it should be noted here that the time duration in which a secondary gas 8 is flushed is from the point of time b at which the piercing is initiated until the point of time c at which the cutting is terminated. It is thus ensured that the secondary gas 8 should not be flushed both during the pre-flow period and during the post-flow period, neither of which affects the quality of cutting. The usage of the secondary gas 8 is thereby minimized. This also minimizes the time duration in which the sound continues that is generated while the secondary gas 8 is being blown out.

Figure 10:
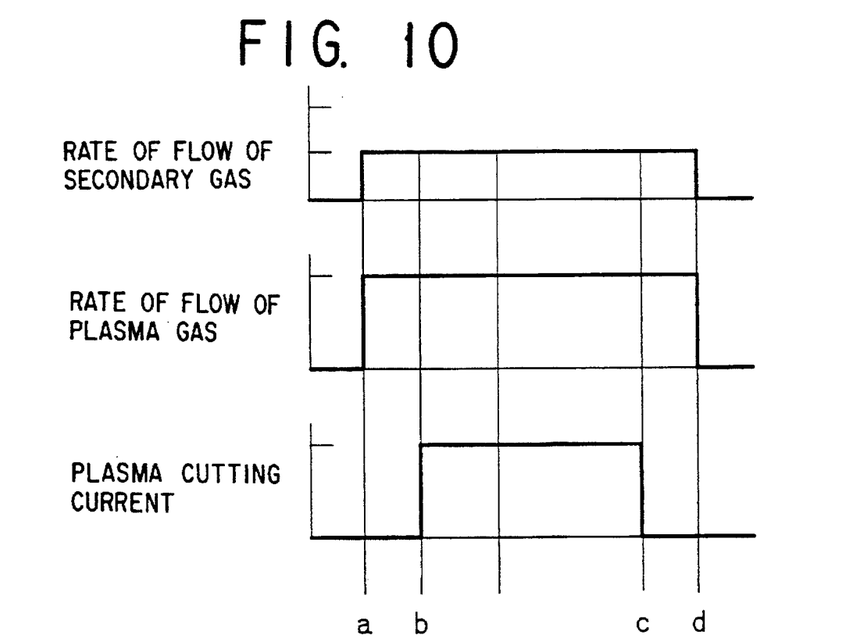
FIG. 10 is a time chart diagrammatically illustrating a mode of operation that is involved in a plasma cutting method of the prior art.

For the purpose of comparison with the above, the time chart in the mode of operation which is involved in a conventional plasma cutting method is shown in FIG. 10.

Figure 11:
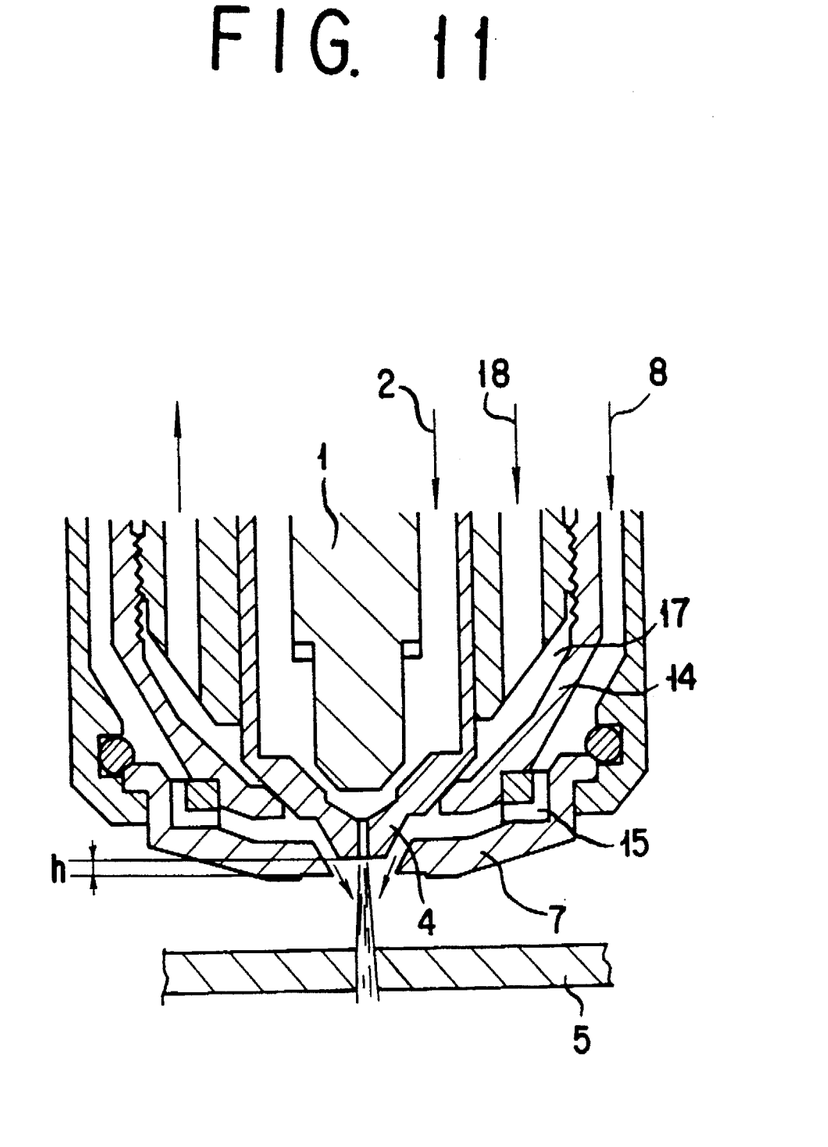
FIG. 11 is a cross sectional view diagrammatically illustrating a plasma torch in a plasma cutting apparatus that is used to carry out a third embodiment of the plasma cutting method according to the present invention.

FIG. 11 shows the cross section of a plasma torch in a plasma cutting apparatus for carrying out a third embodiment of the plasma cutting method according to the present invention. As shown, the instant embodiment of the present invention is designed to directly cool the confining nozzle 4 by flushing a space 17 formed between the latter and a cap 14 with a water coolant 18. The assisting nozzle 7 which is made up of a metallic body is positioned relative to the cap 14 with a spacer 15 which is made up of an electrically insulating material. The spacer 15 is provided with a passage for flushing the secondary gas 8. The secondary gas 8 is passed between the cap 14 and the assisting nozzle 7, then flushing out of a blow-out opening provided at the front end of the assisting nozzle 7.

It should also be noted that the confining nozzle 4 and the assisting nozzle 7 have a relative positional relationship that with the gap h between the respective front ends of both the nozzles being h>0, the front end of the confining nozzle 4 is situated inside of the front end of the assisting nozzle 7. By so constructing the nozzles 4 and 7, any accidental contact between the confining nozzle 4 and a workpiece 5 could be avoided so as to protect the confining nozzle 4 since the latter would be blocked by the assisting nozzle 7 even if the workpiece 5 were accidentally leaped up during a cutting operation. Also, since the confining nozzle 4 is electrically insulated from the assisting nozzle 7, it will be apparent that a "double arc" condition as might be produced when an electric current is passed between the confining nozzle 4 and the workpiece may not occur, thereby protecting the confining nozzle 4.

The effect of protecting the confining nozzle 4 is likewise obtainable by making up the assisting nozzle 7 of an electrically insulating material. It is then possible also to construct the spacer 15 and the assisting nozzle 7 integrally with each other.

Figure 12:
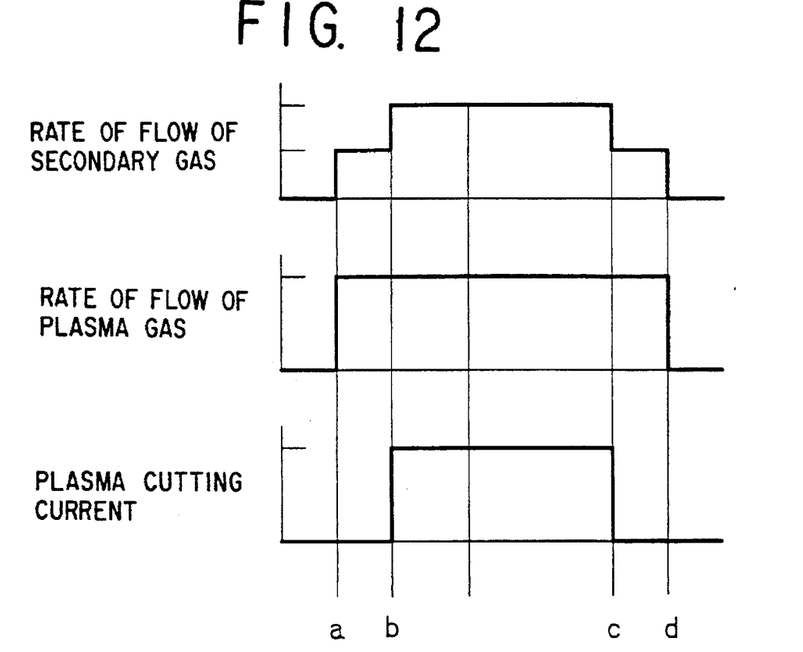
FIG. 12 is a time chart diagrammatically illustrating a mode of operation that is involved in the above mentioned third embodiment of the plasma cutting method according to the present invention.

FIG. 12 shows a time chart of a mode of operation that is involved in carrying out a third embodiment of the plasma cutting method according to the present invention. As shown, in the instant embodiment, the rate of flow of the secondary gas 8 per unit area Vq is so set that both during the pre-flow period and during the post-flow period it may be at a level less than 250 $(m^3/sec)/m^2$ which level is less than during a cutting operation and that it may be at an elevated level not less than 250 $(m^3/sec)/m^2$ from the point of time b at which the workpiece material 5 is started to be pierced until the point of time c at which the cutting current is terminated. The switching of the secondary gas 8 is achieved e.g. with an arrangement, as shown in FIG. 4, in which a supply line for the secondary gas 8 is branched into a pair of conduits which are provided with a pair of electromagnetic valves 11 and 12, respectively, and one of which is provided also with a throttle valve 10. In the arrangement of FIG. 4, closing the electromagnetic valve 11 and opening the electromagnetic valve 12 will cause the rate of flow of the secondary gas 8 to be set at a low level whereas opening both the electromagnetic valves 11 and 12 or opening the electromagnetic valve 11 alone will cause the secondary gas 8 to be flushed at an elevated rate of flow. In connection with the above, it should be noted in FIG. 4 that a unit for driving the secondary gas control valves is also shown at 13.

In this plasma cutting apparatus shown in FIGS. 11 and 4, the switching of the rate of flow of the secondary gas 8 as shown in FIG. 12 will be capable of holding down, with the secondary gas 8, the dross which is being blown up from the workpiece material 5, to protect the confining nozzle 4. In this case, since the rate of flow of the secondary gas 8 is held at a low level both during the pre-flow period and during the post-flow period, there will be no difficulty for a pilot arc, either not disturbed or cooled by a flow of the secondary gas 8, to shift to a state in which a plasma arc is generated, and there will also be no difficulty developed in the ignitionability at the starting of cutting.

Figure 13:
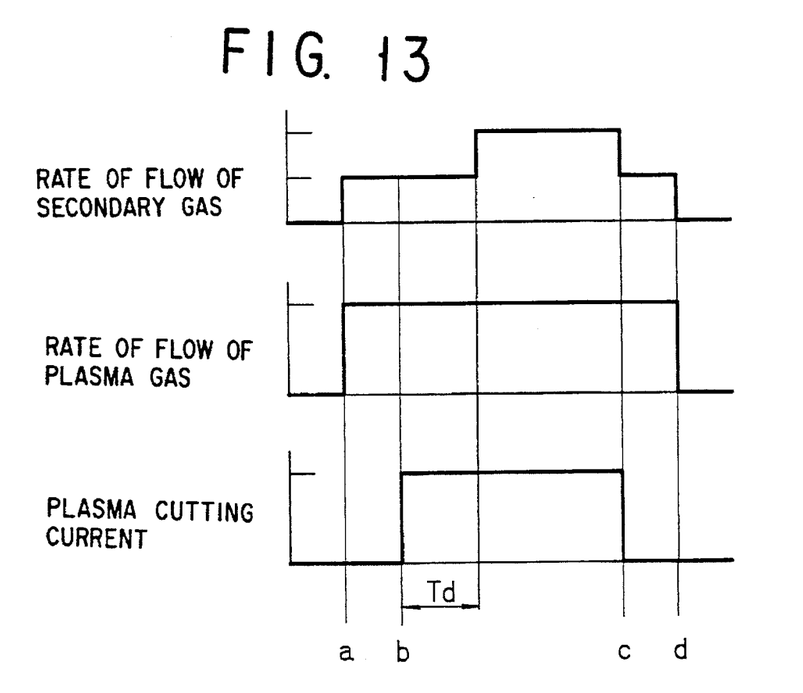
FIG. 13 is a time chart diagrammatically illustrating a mode of operation that is involved in a forth embodiment of the plasma cutting method according to the present invention.

FIG. 13 represents a time chart in a mode of operation that is involved in a fourth embodiment of the plasma cutting method according to the present invention. The time chart shown in FIG. 13 differs from that shown in FIG. 11 in that the switching of the rate of flow of the secondary gas 8 from a low level to an elevated level is accomplished with a delay of time Td after the piercing is initiated following the start of the pre-flow period. This mode of operation can be achieved by constructing the plasma torch or the plasma cutting apparatus as shown in FIG. 4 or FIG. 11 and at the same time by incorporating a time delay element in the unit 13 for driving the control valves for the secondary gas 8 as shown in FIG. 4.

Figure 14:
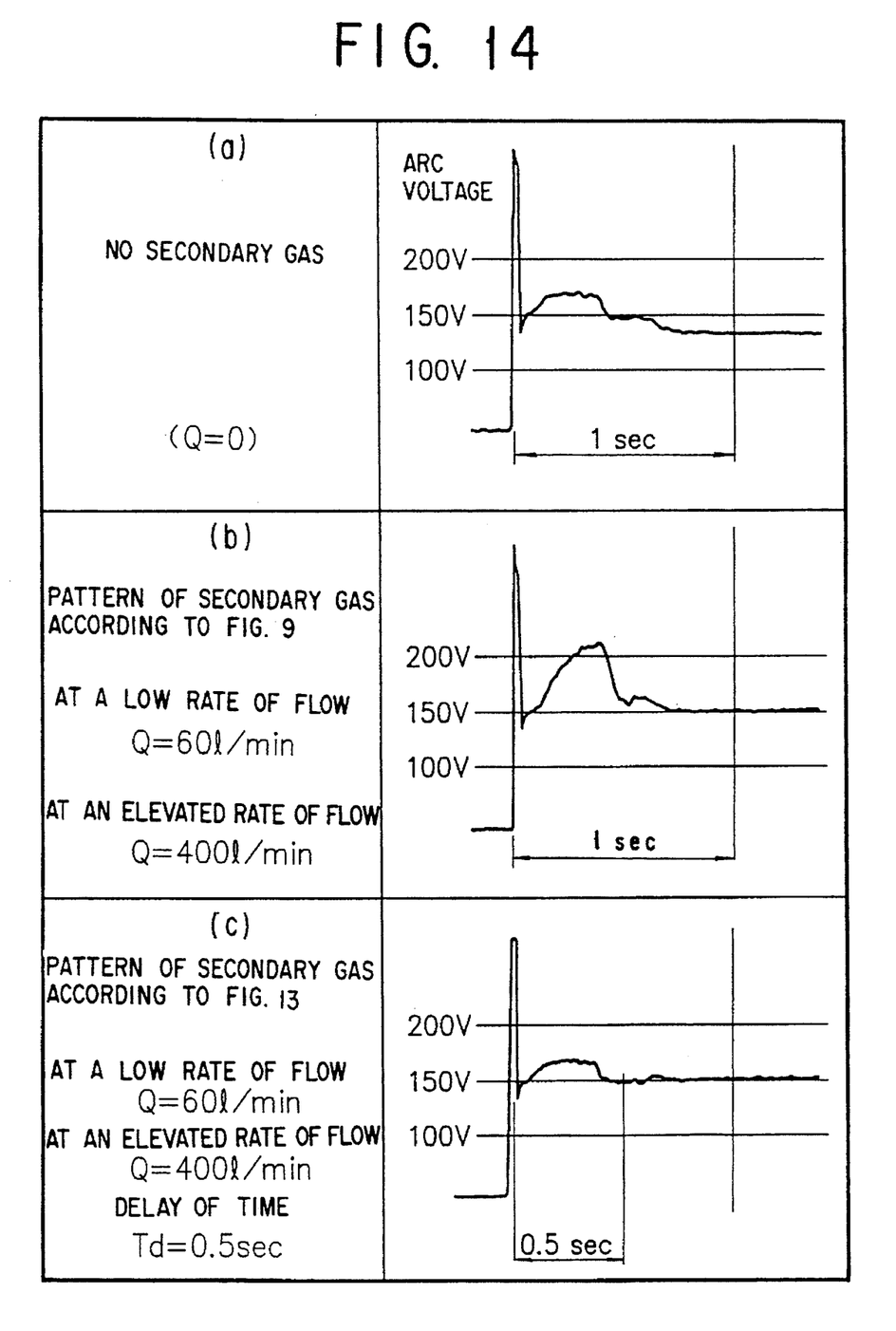
FIGS. 14(a)–(c) are graphs diagrammatically illustrating certain results of a measurement with respect to the effects which ensue when the timing for switching the rate of flow of a secondary gas is altered as shown in FIG. 13.

In FIG. 14, there are shown certain results of measurements made with respect to the effects which may ensue when the timing of switching the rate of flow of the secondary gas 8 as shown in FIG. 13 is variously altered. FIG. 14(a) shows a wave form of the plasma arc voltage which is observed immediately after the piercing is finished in a cutting mode in which the secondary gas 8 is not flushed. FIG. 14(b) shows a wave form of the plasma arc voltage which is observed when the rate of flow of the secondary gas 8 is switched to an elevated level immediately after the piercing is initiated as shown in the time chart of FIG. 9. FIG. 14(c) shows a wave form of the plasma arc voltage which is observed in case a delay of time is incorporated immediately after the piercing is initiated as shown in FIG. 13 to switch the rate of flow of the secondary gas 8 to an elevated level, with the delay of time being here set to Td=0.5 sec.

According to the above mentioned measurement results, it is seen that in the wave form (b) an elevated voltage peak appears at approximately 0.3 second after the piercing is initiated whereas in the wave form (c) that results when a delay of time is incorporated such a voltage peak disappears. It is thus seen that by adequately altering the timing of switching the rate of flow of the secondary gas 8, a rise of the arc voltage due to an elevated rate of flow of the secondary gas 8 can be controlled.

Since a rise of the arc voltage can be controlled, in this manner, by incorporating a delay of time to switch the rate of flow of the secondary gas 8 to an elevated level, it is made possible perform a stabilized cutting operation without encountering a possible arc extinction immediately after the piercing is finished and without unnecessarily heightening the suppliable output voltage of a power supply. Also, in the present mode of operation a protection of the confining nozzle 4 by way of the assisting nozzle 7 can be achieved as in the mode of operation shown in FIG. 12.

In connection with the preceding discussion, it should be noted that a pattern of altering the rate of flow of the secondary gas 8 as in any mode of operation as shown in FIG. 9, 12 or 13 and a pattern of altering the rate of flow of the secondary gas 8 as in the mode of operation shown in FIG. 10 can be interchangeably used with a single plasma cutting apparatus with ease. It is then seen that a cutting operation for a stainless steel sheet workpiece material requiring the rate of flow of the secondary gas to be at an elevated level and a cutting operation for a different class of the workpiece material such as a mild steel can both be carried out with a single plasma cutting apparatus. This is because in cutting a usual workpiece material such as a mild steel the secondary gas 9 at a low level of the rate of flow can continue to be flushed during the cutting of the workpiece material 5 as well in order to protect the confining nozzle 4 from the dross which is being blown up from the workpiece material 5. Thus, the rate of flow of the secondary gas 8 can simply be switched in view of the fact that as the fate of flow of the secondary gas 8 is increased as in the above mentioned first embodiment of the present invention, the plasma flow will be disturbed and cooled so as to lower the cutting capacity. Thus, if such a switching function is incorporated, it is clear that it becomes possible to cut a variety of workpieces with readiness as well as with simplicity.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A plasma cutting method using a plasma cutting apparatus which comprises a plasma torch including: an electrode adapted to confront a workpiece for forming a plasma arc between said electrode and said workpiece when they are energized by a plasma power supply; a confining nozzle so arranged as to surround said electrode with a spacing therefrom that defines a passage for flushing a plasma gas constituting the plasma arc impinging on said workpiece, thereby cutting the workpiece; and an assisting nozzle so arranged as to surround said confining nozzle with a spacing therefrom that defines a passage for flushing a secondary gas so as to cause its flow to be pinched therein and to impinge on said workpiece while surrounding said plasma gas, in which a rate of flow of said secondary gas per unit area Vq which is expressed by an equation: Vq=Q/A2 is not less than 250 (m$^3$/sec)/m$^2$, where Q is a rate of flow of said secondary gas and A2 is a sectional area in which the flow of said secondary gas is pinched.

2. A plasma cutting method as set forth in claim 1, characterized in that said confining nozzle is provided with a front end having an outer diameter D1 which is not less than 1.5 mm and not greater than 4.0 mm; said front end of said confining nozzle has an outside pinching angle α which is equal to or greater than 0° and less than 90° ; said assisting nozzle is provided with a pinching portion having an inner diameter D2 which is not less than 2.0 mm; and said assisting nozzle is provided with a front end having an inside pinching angle β which is equal to or greater than 0° and less than 90°.

3. A plasma cutting method as set forth in claim 1 or claim 2, characterized in that said secondary gas which is flushed from said assisting nozzle is terminated during each of a pre-flow period and a post-flow period and is flushed only in a period from immediately after a start of cutting until an end thereof.

4. A plasma cutting method as set forth in claim 1 or claim 2, characterized in that the front end of said assisting nozzle is designed to project beyond the front end of said confining nozzle, that said assisting nozzle is electrically insulated from said confining nozzle; that the rate of flow of said secondary nozzle that is flushed from said assisting nozzle is held at a low value as compared with the rate of flow of that which is flushed at a start of cutting; and that said rate of flow Vq is increased to not less than 250 (m$^3$/sec)/m$^2$ only in a period from immediately after said start of cutting until an end thereof.

5. A plasma cutting method as set forth in claim 4, characterized in that the rate of flow of said secondary gas is switched from said low flow value to not less than Vq=250 (m$^3$/sec)/m$^2$ with a predetermined delay of time from immediately after said start of cutting.

6. A plasma cutting method using a plasma cutting apparatus which comprises a plasma torch including: an electrode adapted to confront a workpiece for forming a plasma arc between said electrode and said workpiece when they are energized by a plasma power supply; a confining nozzle so arranged as to surround said electrode with a spacing therefrom that defines a passage for flushing a plasma gas constituting the plasma arc impinging on said workpiece, thereby cutting the workpiece; and an assisting nozzle so arranged as to surround said confining nozzle with a spacing therefrom that defines a passage for flushing a secondary gas so as to cause its flow to be pinched therein and to impinge on said workpiece while surrounding said plasma gas, in which said confining nozzle is provided with a front end having an outer diameter D1 which is not less than 1.5 mm and not greater than 4.0 mm; said front end of said confining nozzle has an outside pinching angle α which is equal to or greater than 0° and less than 90°; said assisting nozzle is provided with a pinching portion having an inner diameter D2 which is not less than 2.0 mm; and said assisting nozzle is provided with a front end having an inside pinching angle β which is equal to or greater than 0° and less than 90°.

* * * * *